Jan. 19, 1954   A. E. HAGEDORN   2,666,238
STUDDING ANCHOR
Filed Dec. 8, 1950
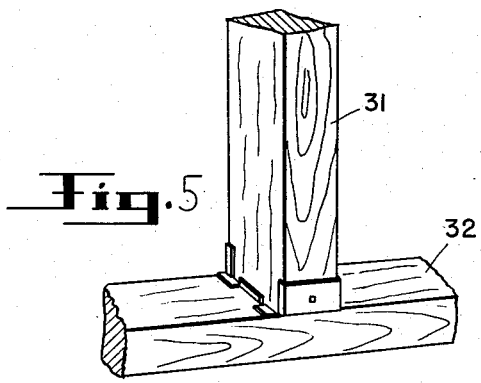
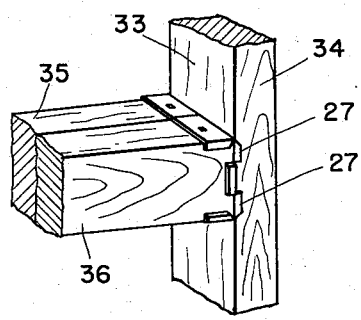
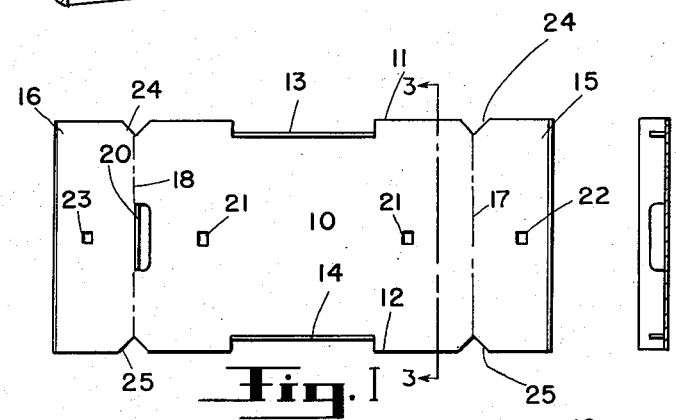
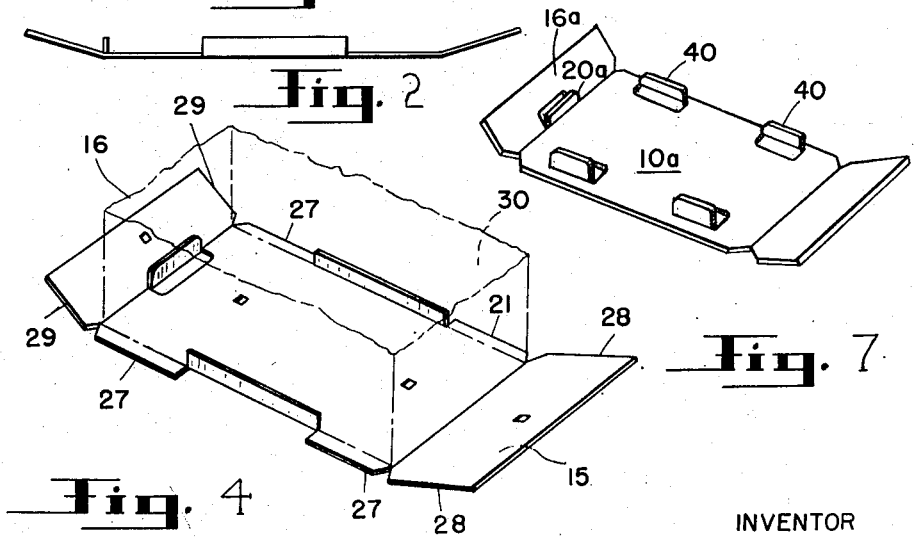
INVENTOR
ALBERT E. HAGEDORN
BY
ATTORNEYS.

Patented Jan. 19, 1954

2,666,238

UNITED STATES PATENT OFFICE 2,666,238

STUDDING ANCHOR

Albert E. Hagedorn, Dayton, Ohio

Application December 8, 1950, Serial No. 199,849

1 Claim. (Cl. 20—95)

This invention relates to a device for connecting timbers together.

An object of the invention is to provide an inexpensive device for use in connecting timbers and to simplify nailing of timbers together.

In erecting frame structures, such as houses, garages etc. it is conventional practice to toe-nail timbers together. This is essential in the erection of studs on wall plates, in framing windows and in other framing of the structure. This entails considerable time, requires large quantities of nails and in many cases the timbers are split weakening the joint that is being made.

It is therefore another object of the invention to provide an inexpensive device for connecting of timbers that completely eliminates the necessity for toe-nailing and permits all nails to be driven into the timbers normal to the surface of the timber.

It is still another object of the invention to provide an inexpensive device for connecting of timbers that can be used to lock timbers relative one to the other such as when erecting studs on a wall plate.

Another object of the invention is to provide a device for connecting of timbers that will lock the timbers in place relative to each other.

Further objects and advantages will become apparent from the drawings and the following description.

Figure 1 is a plan view of a connector constructed in accordance with this invention.

Figure 2 is a side elevational view of the connector of Figure 1.

Figure 3 is a cross-sectional view taken along line 3—3 of Figure 1.

Figure 4 is a perspective elevational view of the connector of Figures 1, 2 and 3.

Figure 5 is a perspective elevational view illustrating the use of the timber connector for securing studs to a wall plate.

Figure 6 is a perspective elevational view illustrating the use of the connector for framing windows.

Figure 7 is a perspective elevational view of a modified form of timber connector.

In this invention the timber connector consists of a base portion 10 that is in the form of a quadrilateral, and may particularly be in the form of a rectangle. The side edges 11 and 12 of the base portion 10 are each provided with an upwardly flanged portion 13 and 14. The flanges 13 and 14 are spaced apart a distance equal to the dimension of the width of a timber with which the device is adapted for use. For example, the distance between the flanges 13 and 14 would be 1⅝", the finished width of a standard 2" x 4" stud.

The base portion 10 is provided with an end portion 15 at one end thereof and with an end portion 16 at the opposite end. The end portions 15 and 16 may lay in the plane of the base portion 10, or preferably are formed upwardly as illustrated in Figures 2 and 4, but bent along the bends 17 and 18 respectively. The bend lines 17 and 18 are spaced apart a distance equal to the finished dimension of a stud, which in this instance would be a dimension of 3⅝".

The base portion 10 is therefore adapted to fit upon one end of the timber with the sides of the timber engaged by the flanges 13 and 14 and with the ends of the timber aligned with the bend lines 17 and 18.

To insure proper alignment of the timber with the bend lines 17 and 18, a guide flange 20 is formed upwardly from the base portion 10 in the same direction as the flanges 13 and 14. Thus when a stud is placed in position upon the base portion 10 with one edge against the guide flange 20, the bend lines 17 and 18 will be properly aligned with the edges of the stud so that the end portions 15 and 16 can be bent upwardly against the edges of the stud.

Nail holes 21 are provided in the base portion 10 through which nails can be driven for securing the base portion to a timber. A nail hole 22 is provided in the end portion 15 and a similar nail hole 23 is provided in the end portion 16 through which nails can be driven into a timber for connection thereof to the timber upon which the base portion is nailed. The nail holes 21, 22 and 23 can be suitably staggered to avoid splitting of the timber and to avoid interference between nails being driven into the timber.

The side edges 11 and 12 of the base portion 10 are provided with notches 24 and 25 respectively in alignment with the bend lines 17 and 18 to prevent interference between the various portions of the connector when bent around the edge of the stud.

As shown in Figure 4, the base portion 10 has the flange portions 27 that extend beyond the side edges of a timber 30 which can be bent either upwardly or downwardly by a hammer blow after assembly of the timber connector between connecting timbers. Similarly, the end portion 15 is provided with flanges 28 and the end portion 16 is provided with flanges 29.

Figure 5 illustrates the use of the timber connector heretofore described for securing a stud 31 to a floor plate 32. The timber connector is placed transversely of the floor plate 32 and nails driven through the holes 21 to secure the connector to the floor plate. The timber connectors are spaced one from the other along the floor plate 32 such that the studs 31 will be positioned the standard distance apart of 16" on centers. The guide flange 20 is aligned with one longitudinal edge of the floor plate 32, and this is readily accomplished by aligning the bend line 18 or the notches 24 and 25 with the longitudinal edge of the floor plate. A stud 31 is then placed upon the timber connector and the end portions 15 and 16 bend upwardly to engage the end edges of the stud 31, nails being driven into the stud through the holes 22 and 23 in the end portions 15 and 16. The side flanges 28 of the end portion 15 and the side flanges 29 of the end portion 16 are then bent around the edge corners of the stud 31 by a hammer blow as illustrated in Figure 5, thus locking the stud 31 in place on the floor plate 32.

Since all nails are driven into the timbers 31 and 32 normal to the surfaces of the timbers, they can be readily withdrawn at any time without splitting the timbers and thereby permit reuse of the timbers for other purposes. This is a decided advantage over conventional toe-nailing which usually damages the ends of the timber being toe-nailed so that it can only be reused after cutting off the damaged end thus avoiding its re-use in its original length.

In Figure 6 there is illustrated the use of the timber connector of Figures 1 to 4 for window framing. In this instance two timber connectors are placed side by side on the broad face 33 of the stud 34. Each of the timber connectors receives a framing stud 35 and 36 and is secured to the vertical stud 34 in the same manner as heretofore described. In this instance the flanges 27 on the base portion 10 can be bent around the timber 34 by a hammer blow to lock the connectors in place, this being in addition to the conventional nailing.

In Figure 7 there is illustrated a slightly modified form of timber connector in which the guide flange 20a is formed out of the end portion 16a in place of being formed out of the base portion, as illustrated in Figures 1 and 4. However, in either form the guide flange 20 or 20a is positioned at the bend line between the end portions 16 and the base portion 10.

Also, in Figure 7 the side flanges 40 are illustrated as being formed out of the base portion 10 rather than having the base portion slit inwardly from the side edge as the flange formed upwardly as illustrated in Figure 1 with reference to the flanges 13 and 14. However, the flanges 40 serve the same purpose as the flanges 13 and 14. Also the use of the device of Figure 7 is the same as that heretofore described.

While I have disclosed and described here a preferred form of the invention, yet its construction can be modified without departing from the spirit of the invention, and those modifications that fall within the scope of the appended claim are intended to be included herein.

Having thus fully described my invention, what I claim as new and desire to secure by Letters Patent is:

A timber connector comprising a rectangular base portion and a pair of end portions having the same width as the base portion and extending from each of opposite ends of said base portion, said end portions being bent angularly relative to the base portion, said connector having a substantially uniform width throughout its length, a plurality of side flange tabs cut out of said base portion and bent to a perpendicular position relative to the base portion, said tabs being disposed in a straight line along each side of said base but being spaced from the edge of said side to define therebetween a narrow marginal flange relative to said base portion, the flange tabs on either side being equal in number and facing a corresponding tab on the opposite side, an end flange tab cut out of said end portion, bent to extend perpendicularly to said base and positioned on the bend line of said end portion, said end and side tabs comprising means for retaining a timber member therebetween, a plurality of V-shaped notches, each of said notches being cut out of a marginal strip and its adjacent end portion and being located at opposite ends of each of said bend lines between said base and end portions.

ALBERT E. HAGEDORN.

References Cited in the file of this patent
UNITED STATES PATENTS

| Number | Name | Date |
|---|---|---|
| 1,089,499 | Rockwell | Mar. 10, 1914 |
| 1,296,337 | Sullivan | Mar. 4, 1919 |
| 1,945,925 | Stiefel | Feb. 6, 1934 |
| 2,084,758 | Anderson | June 22, 1937 |